No. 894,868. PATENTED AUG. 4, 1908.
A. E. WHITE.
COFFEE URN.
APPLICATION FILED NOV. 20, 1905.

WITNESSES:

INVENTOR
Arthur E. White
BY
ATTORNEY

UNITED STATES PATENT OFFICE.

ARTHUR E. WHITE, OF CHICAGO, ILLINOIS, ASSIGNOR TO THE JAMES HEEKIN COMPANY, OF CINCINNATI, OHIO, A CORPORATION OF OHIO.

COFFEE-URN.

No. 894,868.   Specification of Letters Patent.   Patented Aug. 4, 1908.

Application filed November 20, 1905. Serial No. 288,100.

*To all whom it may concern:*

Be it known that I, ARTHUR E. WHITE, a citizen of the United States of America, and resident of Chicago, county of Cook, State of Illinois, have invented certain new and useful Improvements in Coffee-Urns, of which the following is a specification.

The object of my invention is a means for providing a coffee urn with a continuous supply of freshly made coffee while not interfering with the capacity of drawing coffee from it at any time. To accomplish this end I have a main urn supplied with a series of auxiliary reservoirs, in which fresh coffee may be made as desired.

Figure 1:
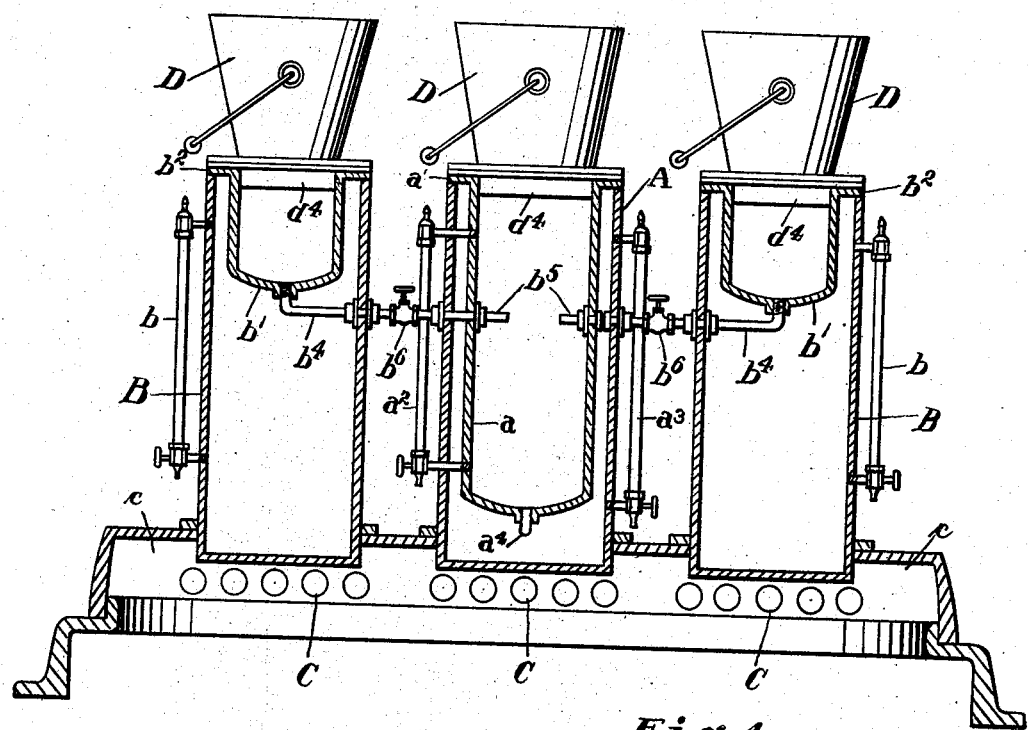
Figure 2:
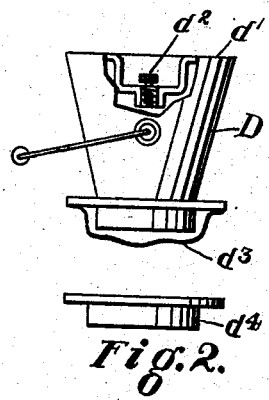

In the accompanying drawings Figure 1 is a longitudinal central sectional view through a coffee urn embodying my invention. Fig. 2 is a detail view of one of the percolators.

Referring to the parts: The main urn consists of an outer vessel, A, an inner reservoir, $a$, which has an annular flange, $a'$, near its top to rest upon the upper edge of the outer vessel, A. Reservoir, $a$, is supplied with a gage, $a^2$, for determining the height of the liquid in it. Outer vessel, A, is supplied with a similar gage, $a^3$. The auxiliary reservoirs consist of an outer vessel, B, supplied with a gage, $b$, and an inner reservoir, $b'$, whose upper edge has a flange, $b^2$, to rest upon the upper end of vessel, B. The reservoirs, $b'$, are smaller than the reservoir of the main urn, the combined capacity of the smaller reservoirs being made preferably equal to that of the reservoir of the main urn. Reservoirs, $b'$, have pipes, $b^4$, leading from their bottoms through the walls of vessels, B, the pipes, $b^4$, being coupled to pipes, $b^5$, which lead into the reservoir of the main urn, a valve, $b^6$, being placed in the pipes to regulate the flow of the liquid from the auxiliary reservoirs into the main urn. Where pipes, $b^4$, pass through the walls of vessels, B, they are supplied with washers and nuts to prevent the leakage of liquid in vessels, B, through the perforations in the wall. Vessels, A and B, are designed to hold water which is to be heated by gas from pipes, C, in the base, $c$, upon which the vessels A and B, rest. The coffee from the main urn is drawn off through a pipe, $a^4$, (the faucet not being shown.)

The upper ends of the inner vessels, $a$, and $b'$, are made to fit the ends, $d^4$, of percolators, D. Said percolators consist of a vessel closed at one end, $d'$, open at the other end and having a valve, $d^2$, in the closed end. The open end is to be covered by a strainer, $d^3$, which is held in place by a collar, $d^4$.

The operation of this device for making coffee is similar to that shown in United States Letters Patent No. 650,129, granted May 22nd, 1900, to Charles Lewis, viz.; the ground coffee is placed in vessel, D, while it is standing upon its closed end, and while valve, $d^2$, is closed. Hot water is then poured into the vessel, D and the strainer is placed over the open end and held in place by the collar. Then the percolator is placed, open end downward, into one of the reservoirs. Then the valve is opened and the coffee will commence to drip through the strainer into the reservoir.

With my urn it is seen that coffee may be made in one of the percolators and be allowed to drip in to the reservoir of the main urn, to be thence drawn off as customers call for it, from the pipe, $a^4$. When the gage in the reservoir of the main urn indicates that the coffee is getting low in the main urn, a fresh supply of coffee may be made in another percolator and be allowed to drip into one of the auxiliary reservoirs, the same being then drawn off from the auxiliary reservoir into the main urn by opening the valve between the auxiliary reservoir and the main urn. A continuously fresh supply of coffee is thus being fed to the main urn without interfering with the capacity to draw coffee off through the faucet of the main urn at any time. The hot water in the outer vessels, A, and B, surrounding the inner vessels maintains the coffee at the proper temperature at all times.

What I claim is:

1. The combination of a main urn, a series of auxiliary reservoirs whose bottoms are in a plane above the plane of the bottom of the main urn, pipes leading from points near the bottoms of the auxiliary reservoirs into the main urn and a series of percolators from which coffee may be percolated into the main urn and into the auxiliary reservoirs successively.

2. In a coffee urn the combination of a base, a main urn, auxiliary reservoirs supported upon the base, a series of heating pipes beneath the urn and the reservoirs, the main urn and each reservoir consisting of an inner and an outer vessel, the inner vessel of the main urn being larger than the inner vessels of the auxiliary reservoirs and having its bottom in a plane below the bottoms of the inner vessels of the auxiliary reservoirs, pipes leading from points near the bottoms of the inner vessels of the auxiliary reservoirs to the inner vessel of the main urn and percolators from which coffee may be percolated into the main urn and into the auxiliary reservoirs.

3. In an apparatus for the infusion of beverages the combination of a main reservoir and an auxiliary reservoir both having open tops and the bottom of the main reservoir extending below the bottom of the auxiliary reservoir, a pipe leading from the bottom of the auxiliary reservoir into the main reservoir and percolators consisting of vessels open at one end, closed at the other, with valves in the closed ends and strainers over the open ends of the vessels and with seats formed at the open end of the vessels to fit upon the upper ends of the main and of the auxiliary reservoirs.

ARTHUR E. WHITE.

Witnesses:
WALTER F. MURRAY,
AGNES McCORMACK.